United States Patent
Veeraswamy

(10) Patent No.: US 8,924,773 B1
(45) Date of Patent: Dec. 30, 2014

(54) REDUCING FILE SYSTEM DATA UNAVAILABILITY WINDOW BY ADAPTING HIERARCHICAL RECOVERY FRAMEWORK

(75) Inventor: Sairam Veeraswamy, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 13/538,126

(22) Filed: Jun. 29, 2012

(51) Int. Cl.
*G06F 11/00* (2006.01)

(52) U.S. Cl.
USPC .......................................................... 714/6.1

(58) Field of Classification Search
CPC ............ G06F 17/30067; H04L 9/0836; Y10S 707/99931; Y10S 707/99953
See application file for complete search history.

(56) References Cited

U.S. PATENT DOCUMENTS

| | | | |
|---|---|---|---|
| 6,205,563 B1 * | 3/2001 | Lewis ........................... | 714/47.3 |
| 6,886,116 B1 | 4/2005 | MacLellan et al. | |
| 7,649,191 B2 | 1/2010 | Czubatyj et al. | |
| 7,730,363 B2 * | 6/2010 | Takezawa et al. ........... | 714/47.1 |
| 7,873,619 B1 | 1/2011 | Faibish et al. | |
| 7,882,386 B1 | 2/2011 | Potnis et al. | |
| 7,890,794 B1 | 2/2011 | Gasser | |
| 7,930,161 B1 | 4/2011 | Vijendra et al. | |
| 7,949,739 B2 | 5/2011 | Florissi et al. | |
| 8,037,345 B1 | 10/2011 | Iyer et al. | |
| 8,095,777 B2 | 1/2012 | Blaner et al. | |
| 8,447,719 B2 * | 5/2013 | Bethke et al. ................... | 706/49 |
| 2004/0078683 A1 * | 4/2004 | Buia et al. ...................... | 714/37 |

* cited by examiner

*Primary Examiner* — Christopher McCarthy
(74) *Attorney, Agent, or Firm* — BainwoodHuang

(57) ABSTRACT

A storage processor isolates and classifies file system faults and inconsistencies to produce a fault tree for inline error recovery. The storage processor isolates the metadata objects or objects that have internal inconsistencies, the storage processor creates a fault tree to map the file system; or portion of the file system with the errors or inconsistencies and the metadata objects dependent upon those objects. Once the fault having been mapped, determine the complexity of recovering the branch of the fault tree with the error. If the error is not too complex, performing recovery of the metadata objects online otherwise taking the system offline for file system recovery.

22 Claims, 5 Drawing Sheets

REDUCING FILE SYSTEM DATA UNAVAILABILITY WINDOW BY ADAPTING HIERARCHICAL RECOVERY FRAMEWORK

BACKGROUND

A file system is a way of organizing data for persistent storage. The file system is broken into user data, the data a user expects to see when requesting a file and metadata, the data that defines the internal hierarchy of the file system.

In file systems errors occur for a number of reasons. Software logic errors, checksum errors or media errors cause inconsistencies within the metadata responsible for describing the internal structure of the file system.

The file system will eventually attempt to process the metadata with inconsistencies or errors that will likely cause the file system to crash. When this occurs, a conventional file system recovery tool is executed to set the metadata objects within the file system to a consistent state. The length of time the conventional file system recovery runs is dependent upon the size of the file system and the number of metadata objects within the file system that must be corrected to set the file system to a consistent state.

SUMMARY

Unfortunately, there are deficiencies with the above-described conventional file system recovery tool. For example, not all metadata errors or inconsistencies are fatal to the entire file system and therefore the file system need not be taken offline. Further, waiting until metadata errors or inconsistencies causes a file system to crash allows for the exacerbation of the inconsistent metadata within the file system and increases time to recover the file system as a larger number of metadata blocks must be repaired in order for the file system to properly function.

In contrast to the above described conventional file system error recovery tool in which internal metadata inconsistencies prevent further file system processing, an improved technique isolates and classifies faults to produce a fault tree for inline error recovery of the isolated fault. This is accomplished by performing shallow consistency checking in the background or detecting I/O code path errors. Shallow consistency checking involves, block level and object level CRC checks, and bit compare with duplicate copy. Once the inconsistencies or errors have been detected, the storage processor isolates the metadata objects or objects that have internal inconsistencies. The storage processor creates a fault tree to map the file system, or portion of the file system with the error and the metadata objects dependent upon those objects or objects that have internal inconsistencies or errors. If the error is not too complex, performing recovery of the metadata objects. If the complexity of the inconsistencies or errors is too great for online recovery, then isolate the branch of the fault tree with the errors until a maintenance window; saving the fault tree for use during recovery of the branch during a maintenance window. If during the maintenance window the fault tree does not provide enough information to recover the file system, then alternatively execute a file system recovery to fully recover the file system.

Advantageously, the improved technique dramatically lowers the time required to recover an error or metadata inconsistency, prevents the need to take the entire file system offline to repairs a branch, and allows for the isolation of portions of the file system identified by isolating a branch of the fault tree.

One embodiment of the improved technique is directed to a method to reduce file system data unavailability upon detecting a fault in the file system, the file system including a hierarchy of objects, the hierarchy of objects stored on slices of a storage device group, the method includes the steps of creating a fault tree representative of the hierarchy of objects. Next, identify within the fault tree, a fault branch identified by an object of the hierarchy of objects producing the fault in the file system. Once the fault tree has been created, deny access by the file system to objects of the fault branch of the fault tree. Then repairing objects in the hierarchy of objects identified by the fault branch of the fault tree and permitting access of objects in the hierarchy of objects identified by the fault branch of the fault tree by the file system The method recovering the fault branch and repairs the metadata objects by creating a recovery plan to that brings a first set of objects of the hierarchy of objects identified by the fault branch of the fault tree into consistent reference to a second set of objects of the hierarchy of objects identified by of the fault branch of the fault tree. In order to know whether to proceed with the offline recover, determining a numeric value indicating a complexity level of the recovery plan. The numeric value may be determined form the number of metadata objects modified or the time required to modify the metadata objects to bring the branch of the file system into a consistent state. If the numeric value indicating the complexity level of the recovery plan is less than or equal to a predefined complexity level, then recover the valid values of the objects in the hierarchy of objects identified by fault branch of the fault tree. Once the branch of the file system has finished recovering, allow access by the file system to the objects of the hierarchy of objects identified by the fault branch. However, if the numeric value indicating the complexity level of the recovery plan is too high, then saving the fault tree and the recovery plan to a save area; and mark the file system for offline recovery.

If the file system is marked for offline recovery then, use the saved fault tree and the recovery plan to perform the offline recovery of the fault branch during a maintenance window. However, if the complexity of the recovery plan is too complex, then perform a full file system recovery using traditional file system recovery tools.

Additionally, some embodiments of the improved technique are directed to a system constructed and arranged to provide a storage processor that includes a storage device group providing persistent storage of file system data, the file system data stored onto slices of the storage device group and a controller circuit that detects a fault. Upon detecting the fault create a fault tree representative of the hierarchy of objects. Then the controller circuit identifies within the fault tree a fault branch. The fault branch is identified by an object of the hierarchy of objects that produces the fault in the file system. Next because the fault branch of the tree has been identified, deny access by the file system to objects of the hierarchy of objects identified by the fault branch. In this manner only the branch is taken offline rather than the whole file system. Next, repair objects in the hierarchy of objects identified by the fault branch of the fault tree. Once the fault has been repaired, permit access to the fault branch by the file system.

Furthermore, some embodiments of the improved technique are directed to a computer program product having a non-transitory computer readable storage medium which stores code including a set of instructions to carry the method to reduce file system data unavailability upon detecting a fault in the file system, the file system including a hierarchy of objects, the hierarchy of objects stored on slices of a storage device group.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to reducing file system data unavailability upon detecting a fault in the file system, the file system including a hierarchy of objects, the hierarchy of objects stored on slices of a storage device group. The storage processor creating a fault tree representative of the hierarchy of objects, identifying within the fault tree, a fault branch, the fault branch identified by an object of the hierarchy of objects producing the fault in the file system. The fault tree having been created, denying access by the file system to objects of the fault branch of the fault tree. Then repairing objects in the hierarchy of objects identified by the fault branch of the fault tree and permitting access of objects in the hierarchy of objects identified by the fault branch of the fault tree by the file system.

Figure 1:
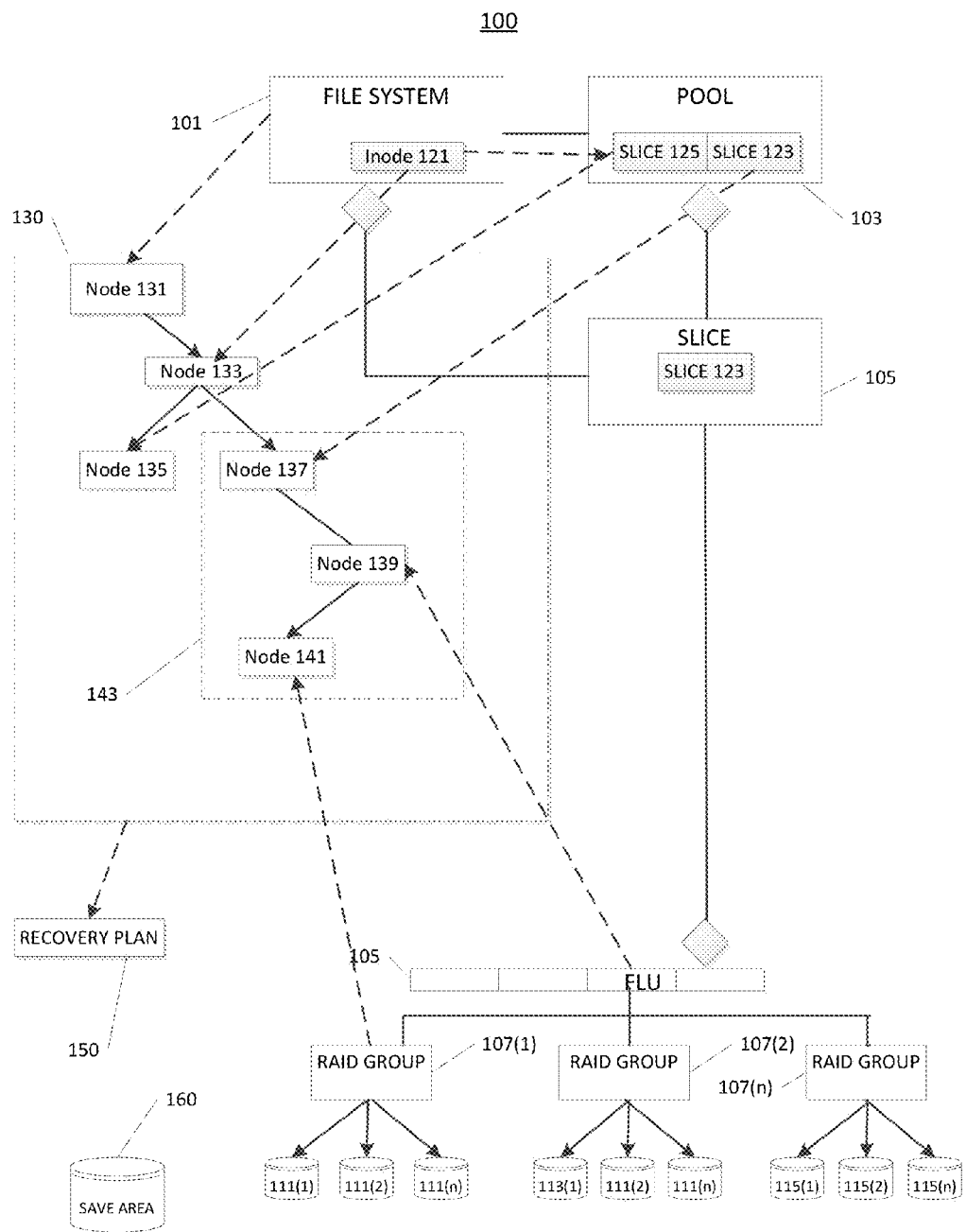
FIG. 1 is a schematic diagram illustrating a storage processor that creates and isolates a branch of a fault tree of a file system for inline recovery.

FIG. 1 is a schematic illustrating a storage processor 100 that creates and isolates a branch of a fault tree 130 of a file system 101 for inline recovery. The storage processor 100 includes the file system 101.

The file system 101 includes both user data and metadata, for example, inode 121. The metadata objects such as inode 121 are stored in sequential blocks known as slices. The slices are allocated from a pool of slices 103 including slices 123 and 125. The slices are stored on disk drives, for example, 111(1)-(n), 113(1)-(n) and 115(1)-(n). It is understood that these disks are divided into logical device groups including RAID groups 107(1)-(3). In order for the file system to access a particular slice 105 in one of the RAID groups, for example slice 123 from the pool of slices 103, it is necessary to translate the location of the slice via a Flare Logical Unit (FLU) 105. The FLU performs translation between a logical location of the slice and the physical location on the groups of disks 111(1)-(n) of, for example, RAID group 107(1).

Upon occurrence of an error or inconsistency, it is necessary to map the objects of the file system. Simplistically, the objects of the storage processor 100 are mapped onto fault tree 130. Each node of the fault tree 130 shows via dotted line the object in the file system 100 that it represents in the tree. Starting with the file system 101 the node 131, a head fault node is mapped. The file system 101 including the inode 121 mapped as fault node 133. The inode 121 is stored on to two slices a primary slice 123 and secondary slice 125 (i.e. backup slice). The primary slice 123 and secondary slice 125 are each mapped onto fault node 135 and fault node 137 respectively. The error occurs somewhere in the secondary slice for the inode 121. Thus, the node 137 links downward to the FLU 105 mapped to fault node 139. The FLU 105 is further linked to RAID groups 107(1)-(n). Here for brevity it is assumed that the slice 123 is stored on RAID group 107(1) mapped to fault node 141.

In a first example of FIG. 1, the storage processor 100 isolates the fault to an error in a slice of the primary slice 123 of the inode 121 after detecting an I/O path error reading the primary slices 123 and secondary slice 125.

Figure 2:
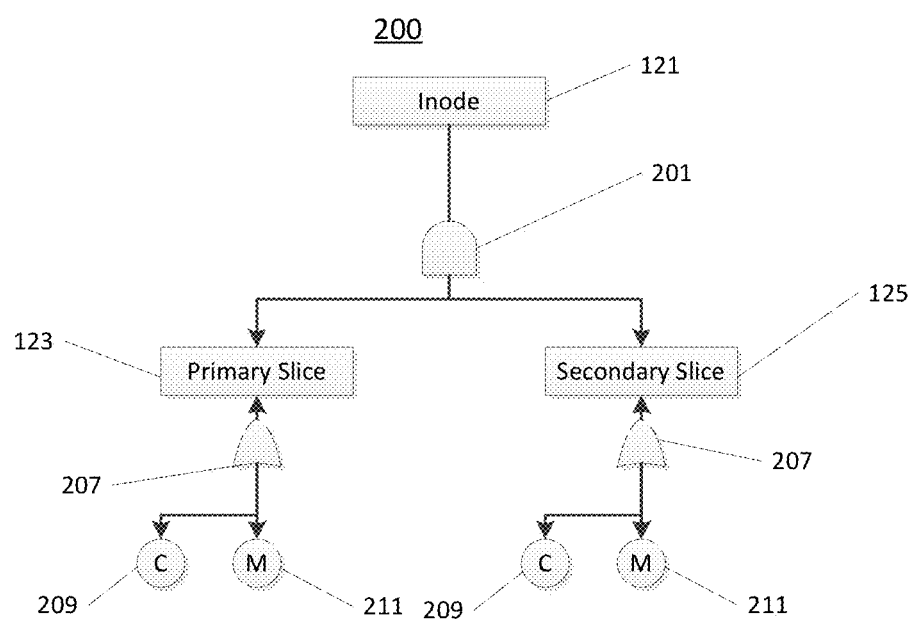
FIG. 2 is a schematic of analysis required to determine a recoverable error in a slice of metadata.

FIG. 2 is a schematic of analysis required to determine a recoverable error in a slice of metadata (i.e. inode 121) an object in the hierarchy of objects of the file system. At the base of the tree an error is detected by ORing together the result of a test for a checksum error 209 and the test for a media error 211 for both the primary slice 123 and secondary slice 125. The resulting test for both the primary slice 123 and the secondary slice 125 are ANDed together and if both are true then it is assumed that the inode 121 as represented in fault node 133 of the fault tree is bad. The fault branch will extend down from fault node 133. A recovery plan 150 will be developed to determine how to recover from the error in the fault branch extending down from fault node 133. Further analysis will determine the complexity of executing the recovery plan. If the complexity of reconstructing the inode is less than or equal a given predetermined value then isolate the branch and rebuild the inode 121

The complexity of the recovery plan 150 can be determined by determining the number of metadata objects that must be modified in order for the recovery plan 150 to be successful. The complexity of the recovery plan 150 can also be the amount of time required to modify the metadata objects and bring them into a consistent state. Further, the complexity as a numerical value could be a combination of both time and modified metadata objects.

A predetermined value for comparison may be an educated guess (i.e. a heuristic) or may be learned through trial and error. The predetermined value may be set system wide or by a an administrator at file system 101 mount time.

In a second example, if only the primary slice 123 has a checksum error 209 or media error 211, the result of the AND 201 will be false and the file system 101 can continue to function. The fault branch 143 would extend down from the fault node 137 representing the primary slice 123. Thus, only the primary slice 123 from fault node 137 will need to be isolated and the file system 101 can continue to function using slice 125. Allocating a new slice to store primary slice 123 is a low complexity transaction and can be assigned a relatively low numerical weight for complexity. Once the new slice to store primary slice 123 has been allocated, the branch of the fault tree beginning at node 137 will no longer be isolated and normal processing can resume.

If the complexity of the recovery plan 150 is greater than the given value, then save the recovery plan 150 and fault tree in the save area 160 for later processing. During a maintenance window, the fault tree 130 and recovery plan 150 can be used to recover the file system offline. If the complexity of the recovery plan 150 is still too great, a normal file system recovery using file system recovery tools can be executed while the file system is offline.

Figure 3:
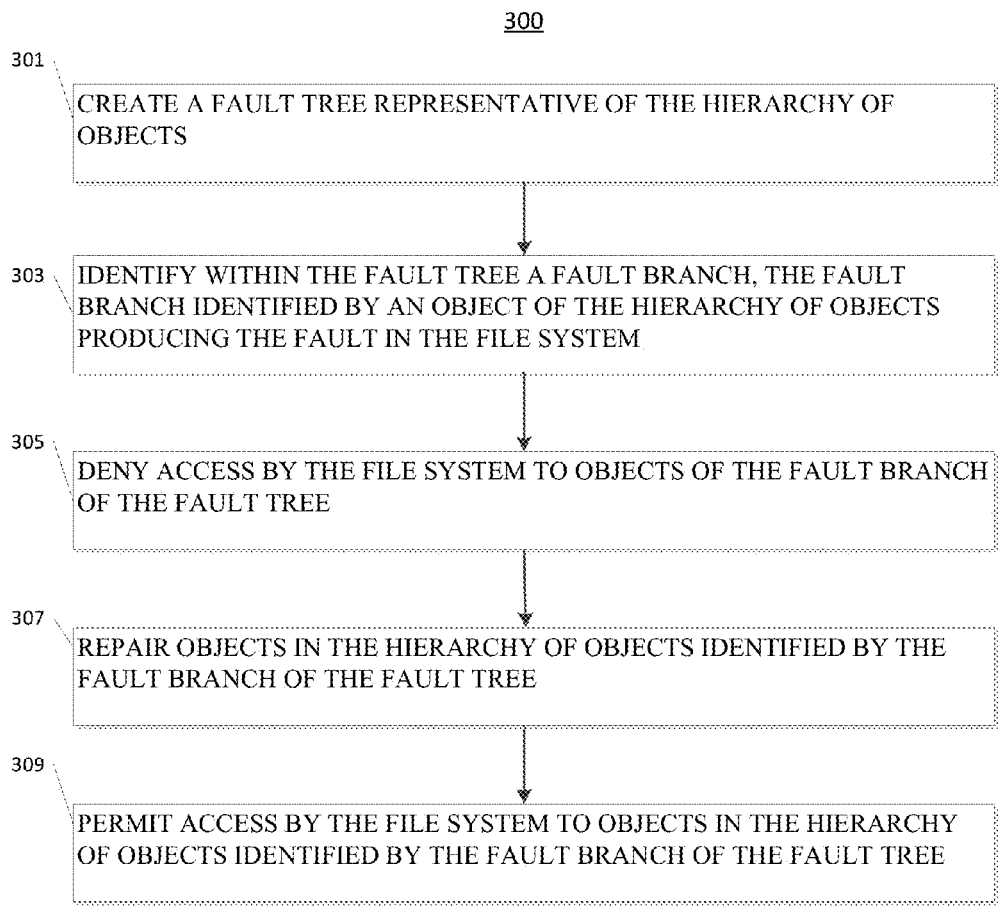
FIG. 3 is a flow chart of a method for reducing file system data unavailability upon detecting a fault in the file system.

FIG. 3 is a flow chart of a method for reducing file system data unavailability upon detecting a fault in the file system 101. At step 301, create a fault tree 130 representative of the hierarchy of objects of the file system 101. In step 303, identify within the fault tree 130 a fault branch (node 137 and below), the fault branch identified by an object (RAID group 107(1) mapped to fault node 141) of the hierarchy of objects producing the fault in the file system 101. Then at step 305, deny access by the file system 101 to objects of the fault branch 143 of the fault tree 130. Next at step 307, repair objects in the hierarchy of objects identified by the fault branch 143 of the fault tree 130. Then at step 309, permit access by the file system 101 to objects in the hierarchy of objects identified by the fault branch 143 of the fault tree 120.

Figure 4:
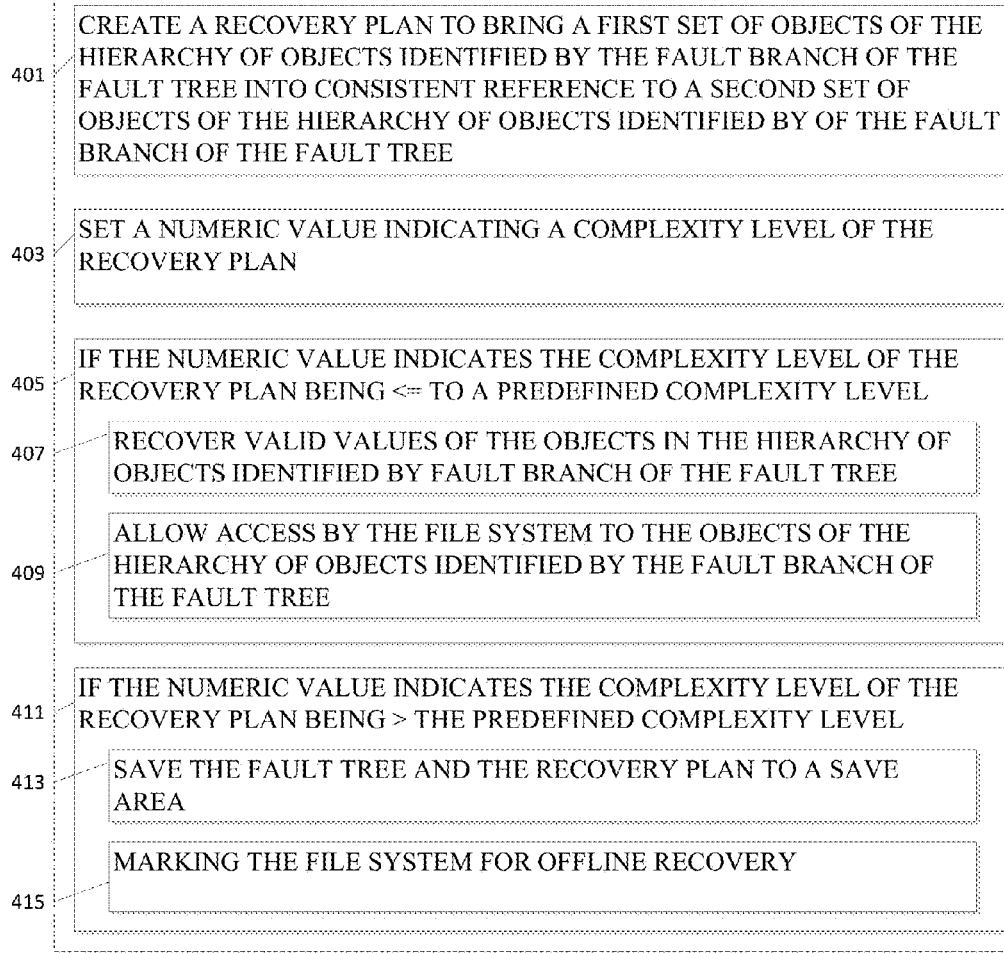
FIG. 4 is a flow chart illustrating the repairing of objects in the hierarchy of objects identified by the fault branch of the fault tree.

FIG. 4 is a flow chart illustrating the repairing of objects in the hierarchy of objects identified by the fault branch 143 of the fault tree 130. At step 401, create a recovery plan 150 to bring a first set of objects of the hierarchy of objects identified by the fault branch 143 of the fault tree 130 into consistent reference to a second set of objects of the hierarchy of objects identified by of the fault branch 143 of the fault tree 130. Next, set a numeric value indicating a complexity level of the recovery plan 150. Then if (405) the numeric value indicating the complexity level of the recovery plan 150 is less than or equal to a predefined complexity level, the at step 407 recover valid values of the objects in the hierarchy of objects identified by fault branch 143 of the fault tree 130. Then at step 409, allow access by the file system 101 to the objects of the hierarchy of objects identified by the fault branch 143 of the fault tree 130. Otherwise, at step 411 if the numeric value indicating the complexity level of the recovery plan is greater than the predefined complexity level, the at step 413, save the fault tree 143 and the recovery plan 130 to a save area and at step 415 mark the file system 101 for offline recovery.

Figure 5:
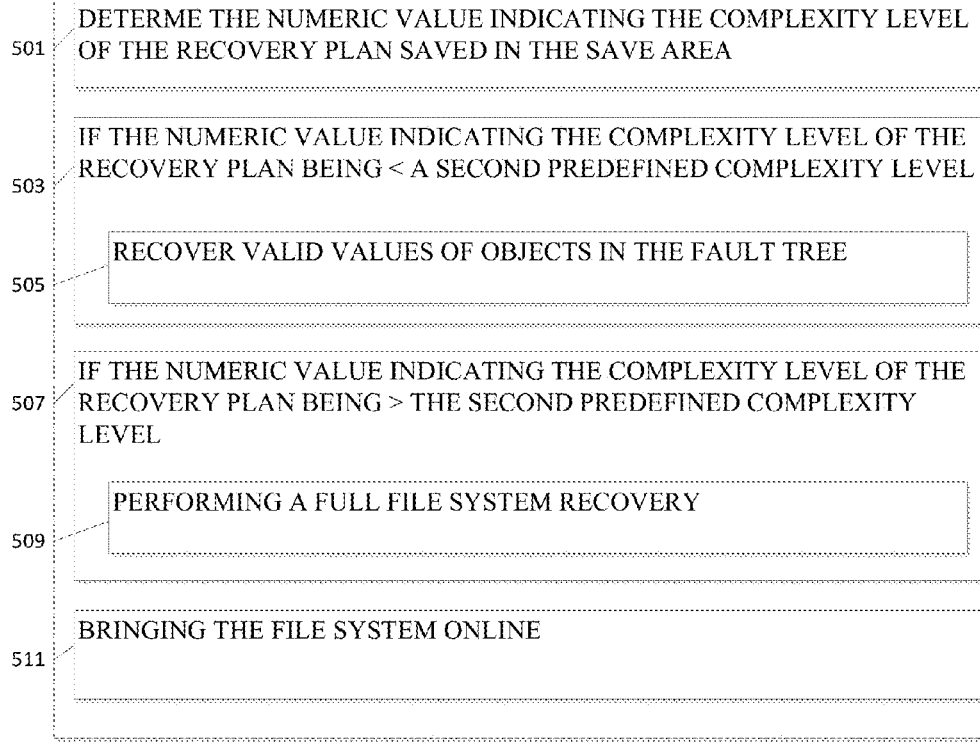
FIG. 5 is a flow chart illustrating a method of taking the file system offline for recovery.

FIG. 5 is a flow chart illustrating a method of taking the file system 101 offline for recovery. If at step 415 the file system is marked for offline recovery, the at step 501, determine the numeric value indicating the complexity level of the recovery plan 150 saved in the save area. Then if (503) the numeric value indicating the complexity level of the recovery plan 150 being less than or equal to a second predefined complexity level,
recovering valid values of objects in the fault tree 143. Then, if (507) the numeric value indicating the complexity level of the recovery plan is greater than the second predefined complexity level, perform a full file system recovery at step 509. Once the file system has been recovered, at step 511 bring the file system online.

While various embodiments of the present disclosure have been particularly shown and described, it will be understood by those skilled in the art that various changes in form and details may be made therein without departing from the spirit and scope of the present disclosure as defined by the appended claims.

For example, FIG. 1 describes a storage processor. It would be understood that the storage processor 100 would have logic implemented in controller circuitry or by execution of a program stored on a persistent storage device, such as a disk drive, by a microprocessor to perform the method steps discussed above.

By way of example, in FIGS. 1 and 2, an error of an indode 121 or the primary slice 123 are explained. The inode 121 and the primary slice 123 and secondary slice 125 are just a limited number of objects in the hierarchy of objects in the file system. Other objects that could be a Logical unit number (LUN), File, Directory, Direct Block, Indirect Block, Block Maps, Slice Pool, to name a few. As each of these objects are objects of the hierarchy of objects, the storage processor will map them and create a fault tree 130 as discussed above performing recovery based on the results of the fault tree 130.

What is claimed is:
1. A method to reduce file system data unavailability upon detecting a fault in the file system, the file system including a hierarchy of objects, the hierarchy of objects stored on slices of a storage device group, the method comprising:
creating a fault tree representative of the hierarchy of objects;
identifying within the fault tree a fault branch, the fault branch identified by an object of the hierarchy of objects producing the fault in the file system;
denying access by the file system to objects of the fault branch of the fault tree;
repairing objects in the hierarchy of objects identified by the fault branch of the fault tree; and
permitting access by the file system to objects in the hierarchy of objects identified by the fault branch of the fault tree.
2. The method of claim 1, wherein repairing objects of the fault branch of the fault tree includes:
creating a recovery plan to bring a first set of objects of the hierarchy of objects identified by the fault branch of the fault tree into consistent reference to a second set of objects of the hierarchy of objects identified by of the fault branch of the fault tree;
setting a numeric value indicating a complexity level of the recovery plan;
upon the numeric value indicating the complexity level of the recovery plan being less than or equal to a predefined complexity level:
recovering valid values of the objects in the hierarchy of objects identified by fault branch of the fault tree;
allowing access by the file system to the objects of the hierarchy of objects identified by the fault branch of the fault tree;
upon the numeric value indicating the complexity level of the recovery plan being greater than the predefined complexity level:
saving the fault tree and the recovery plan to a save area; and
marking the file system for offline recovery.
3. The method of claim 2, wherein recovering the valid values of the objects includes:
identifying by reference to the object of the hierarchy of objects producing the fault, a slice of the slices of the storage device group on which the object is stored producing a hard error; and
replacing the slice with a replacement slice of the slices of the storage device group.
4. The method of claim 2, wherein recovering the valid values of the objects of the hierarchy of objects identified by the fault tree includes:
locating objects of the hierarchy of objects identified by the fault branch of the fault tree with inconsistent references to other objects of the hierarchy of objects identified by the fault branch of the fault tree and setting the inconsistent references to valid values based on a set of known good objects of the hierarchy of objects identified by the fault branch of the fault tree.
5. The method of claim 2, wherein the marking the file system for offline recovery includes:
taking the file system offline;
determining the numeric value indicating the complexity level of the recovery plan saved in the save area;

upon the numeric value indicating the complexity level of the recovery plan being less than or equal to a second predefined complexity level:
recovering the valid values of objects in the fault tree;
upon the numeric value indicating the complexity level of the recovery plan being greater than the second predefined complexity level:
performing a full file system recovery; and
bringing the file system online.

6. The method of claim 2, wherein the numeric value indicating the complexity level of the recovery plan is based on a number of objects required to be set to a consistent state.

7. The method of claim 2, wherein detecting the fault in the file system includes at least one of:
receiving the fault in the I/O path of the object of the hierarchy of objects producing the fault, and
performing as a background process consistency checking of the hierarchy of objects.

8. The method of claim 1, wherein the file system includes an inode; and
wherein creating the fault tree includes mapping the inode of the file system to a fault node of the fault branch of the fault tree.

9. A storage system that reduces file system data unavailability, the system comprising:
a storage device group providing persistent storage of file system data,
the file system data including a hierarchy of objects, the hierarchy of objects stored onto slices of the storage device group;
a controller circuit constructed and configured to:
detect a fault;
create a fault tree representative of the hierarchy of objects;
identify within the fault tree a fault branch, the fault branch identified by an object of the hierarchy of objects producing the fault in the file system;
deny access by the file system to objects of the hierarchy of objects identified by the fault branch of the fault tree;
repair objects in the hierarchy of objects identified by the fault branch of the fault tree; and
permit access by the file system to objects of the hierarchy of objects identified by the fault branch of the fault tree.

10. The system of claim 9, wherein the controller circuit configured to repair objects in the fault branch is further configured to:
create a recovery plan to bring a first set of objects of the hierarchy of objects identified by the fault branch of the fault tree into consistent reference to a second set of objects of the hierarchy of objects identified by the fault branch of the fault tree;
setting a numeric value that indicates a complexity level of the recovery plan;
upon the numeric value that indicates the complexity level of the recovery plan being within a predefined complexity level:
recover valid values of objects in the fault tree;
allow access to branch of the fault tree by the file system;
upon the numeric value indicating the complexity level of the recovery plan being outside the predefined complexity level:
save the fault tree and the recovery plan to a save area; and
mark the file system for offline recovery.

11. The system of claim 10, wherein the controller circuit configured to recover valid values of objects of the hierarchy of objects identified by the fault tree is further configured to:
identify by reference to the object of the hierarchy of objects producing the fault, a slice of the slices of the storage device group on which the object is stored producing a hard error; and
replace the slice with a replacement slice of the slices of the storage device group.

12. The system of claim 10, wherein the controller circuit configured to recover valid values of objects of the hierarchy of objects identified by the fault tree is further configured to:
locate objects of the hierarchy of objects identified by the fault branch of the fault tree with inconsistent references to other objects of the hierarchy of objects identified by the fault branch in the fault tree and setting the inconsistent references to valid values based on a set of known good objects of the hierarchy of objects identified by the fault branch of the fault tree.

13. The system of claim 10, wherein the controller circuit configured to mark the file system for offline recovery is further configured to:
take the file system offline;
determine the numeric value indicating the complexity level of the recovery plan saved in the save area;
upon the numeric value that indicates the complexity level of the recovery plan being within a second predefined complexity level:
recover the valid values of objects of the hierarchy of objects identified by the fault tree;
upon the numeric value that indicates the complexity level of the recovery plan being outside the second predefined complexity level:
perform a full file system recovery; and
bring the file system online.

14. The system of claim 10, wherein the numeric value indicating the complexity level of the recovery plan is based on a number of objects of the hierarchy of objects identified by the fault branch of the fault tree required to be set to a consistent state.

15. The system of claim 10, wherein the controller circuit configured to detect a fault in the file system is further configured to:
receive the fault in the I/O path of the object of the hierarchy of objects producing the fault, and
perform as a background process consistency checking of the hierarchy of objects.

16. A non-transitory computer readable storage medium with a computer program stored thereon, the computer program executed by a processor to perform the method of reducing file system data unavailability upon detecting a fault in the file system, the file system including a hierarchy of objects, the hierarchy of objects stored on slices of a storage device group, the method comprising:
creating a fault tree representative of the hierarchy of objects;
identifying within the fault tree a fault branch, the fault branch identified by an object of the hierarchy of objects producing the fault in the file system;
denying access by the file system to objects of the fault branch of the fault tree;
repairing objects in the hierarchy of objects identified by the fault branch of the fault tree; and
permitting access by the file system of objects in the hierarchy of objects identified by the fault branch of the fault tree.

17. The non-transitory computer readable storage medium of claim 16, wherein repairing objects of the fault branch of the fault tree includes:
- creating a recovery plan to bring a first set of objects of the hierarchy of objects identified by the fault branch of the fault tree into consistent reference to a second set of objects of the hierarchy of objects identified by of the fault branch of the fault tree;
- setting a numeric value indicating a complexity level of the recovery plan;
- upon the numeric value indicating the complexity level of the recovery plan being less than or equal to a predefined complexity level:
  - recovering valid values of the objects in the hierarchy of objects identified by fault branch of the fault tree;
  - accessing the objects of the hierarchy of objects identified by the fault branch of the fault tree by the file system;
- upon the numeric value indicating the complexity level of the recovery plan being greater than the predefined complexity level:
  - saving the fault tree and the recovery plan to a save area; and
  - marking the file system for offline recovery.

18. The non-transitory computer readable storage medium of claim 17, wherein recovering the valid values of the objects includes:
- identifying by reference to the object of the hierarchy of objects producing the fault, a slice of the slices of the storage device group on which the object is stored producing a hard error; and
- replacing the slice with a replacement slice of the slices of the storage device group.

19. The non-transitory computer readable storage medium of claim 17, wherein recovering the valid values of the objects of the hierarchy of objects identified by the fault tree includes:
- locating objects of the hierarchy of objects identified by the fault branch of the fault tree with inconsistent references to other objects of the hierarchy of objects identified by the fault branch of the fault tree and setting the inconsistent references to valid values based on a set of known good objects of the hierarchy of objects identified by the fault branch of the fault tree.

20. The non-transitory computer readable storage medium of claim 17, wherein marking the file system for offline recovery includes:
- taking the file system offline;
- determining the numeric value indicating the complexity level of the recovery plan saved in the save area;
- upon the numeric value indicating the complexity level of the recovery plan being less than or equal to a second predefined complexity level:
  - recovering the valid values of objects in the fault tree;
- upon the numeric value indicating the complexity level of the recovery plan being greater than the second predefined complexity level:
  - performing a full file system recovery; and
- bringing the file system online.

21. The non-transitory computer readable storage medium of claim 17, wherein the numeric value indicating the complexity level of the recovery plan is based on a number of objects of the hierarchy of objects identified by the fault branch of the fault tree required to be set to a consistent state.

22. A method to increase file system data availability upon detecting a fault in a file system including a hierarchy of objects, the hierarchy of objects being stored on slices of a storage device group, the method comprising:
- creating a fault tree representative of the hierarchy of objects;
- identifying within the fault tree a fault branch, the fault branch being identified by an object of the hierarchy of objects producing the fault in the file system;
- denying access by the file system to objects of the fault branch of the fault tree;
- repairing objects of the fault branch of the fault tree; and
- permitting access by the file system to the objects of the fault branch of the fault tree;
- wherein repairing objects of the fault branch of the fault tree includes:
  - creating a recovery plan to bring a first set of objects of the fault branch of the fault tree into consistent reference to a second set of objects of the fault branch of the fault tree;
  - setting a numeric value indicating a complexity level of the recovery plan;
  - upon the numeric value indicating the complexity level of the recovery plan being less than or equal to a predefined complexity level:
    - recovering valid values of the objects of the fault branch of the fault tree; and
    - allowing access by the file system to the objects of the fault branch of the fault tree; and
  - upon the numeric value indicating the complexity level of the recovery plan being greater than the predefined complexity level:
    - saving the fault tree and the recovery plan to a save area; and
    - marking the file system for offline recovery.

* * * * *